Patented Oct. 30, 1923.

1,472,316

UNITED STATES PATENT OFFICE.

JOHANNES KARL ZEISSLER, OF ALTONA, GERMANY, ASSIGNOR, BY MESNE ASSIGNMENTS, TO THE CHEMICAL FOUNDATION, INC., A CORPORATION OF DELAWARE.

SOLUTION OF ALBUMIN CONTAINING MEDICINAL AND IMMUNIZING SUBSTANCES.

No Drawing.     Application filed July 17, 1917. Serial No. 181,130.

*To all whom it may concern:*

Be it known that I, JOHANNES KARL ZEISSLER, a citizen of the German Republic, and a resident of Altona, Elbe, Germany, have invented new and useful Improvements in the Production of Solutions of Albumin Containing Medicinal and Immunizing Substances, of which the following is a specification.

My invention relates to the production of solutions of albumin containing medicinal and immunizing substances, its object being to provide a novel process of concentrating the active substances in solutions of the said kind.

I attain the object of my invention by employing salts of heavy metals, or salts of the precious metals, or salts of semi-precious metals as precipitating agents, that is, as far as such metal salts are capable of producing soluble precipitates of albumin. I apply these precipitants in such a manner that among the numerous precipitates (fractional precipitates) obtained those which in one unit of albumin contain more of, for instance, antitoxin than the initial solution, are found to contain so small quantities of the precipitants used as to be capable of directly dissolving in acidic, neutral, or alkaline water readily and clearly and in an adequate concentration (containing, if possible, more than one per cent of albumin without necessitating any further treatment, such as a dialysis or separation by crystallization). The precipitates thus obtained can be used directly for therapeutical purposes. To obtain 7 precipitations (fractional precipitates) I need but employ 0.3 gram of salt of zinc for a total quantity of albumin equal to 19.4 grams. Hence, the total quantity of precipitating agents used for all fractional precipitations amounts but to 1/65 of the total quantity of albumin split up by the precipitating actions.

The novel process according to my present invention renders it possible to further separate those albumin fractions of the serum which are rich in antitoxin from those which contain a poor proportion of antitoxin; because of the fact that not only those euglobulins which precipitate first and contain but slight proportions of antitoxin—indeed, they are free of antitoxin theoretically—are separated from the pseudo-euglobulins which are rich in antitoxin, but in consequence of the fractional precipitation being continued further there is obtained a separation of the pseudo-euglobulins from those fractions which precipitate last and are likewise poor in antitoxin, viz, the albumins. To secure this effect it is essential that the fractionizing precipitation be continued upon the pseudo-euglobulins which are separated during the first actions of precipitation.

The novel process forming the subject matter of my present invention is developed upon the well known process of separating the entire proportion of albumin contained in milk, by means of sulphate of copper (this process is described in Schmidt, Pharmaceutische Chemie, Organische Chemie, 5. edition, II. Volume, 1911, page 2144, 5. paragraph, and page 2145, 1. paragraph). I have discovered as will be confirmed by the example described hereinafter, that salts of heavy metals may be successfully employed for the fractionizing precipitation of albumins if correspondingly small quantities of such salts are used.

*Example.*

200 cubic centimetres of diptheria antitoxin serum are mixed and shaken with 200 cubic centimetres of distilled water containing 0.08 gram of acetate of zinc; immediately thereafter 1600 cubic centimetres of distilled water are added, and the mixing and shaking operation is repeated. The precipitation No. 1 thus produced is then separated by centrifugal force and dissolved in 31 cubic centimetres of alkaline water. This solution will be found to contain in 1 cubic centimetre 1.6 per cent of albumin and 16 units of antitoxin, hence, 1.0 unit of antitoxin to 1 milligram of albumin.

To the mixture from which the precipitate No. 1 has been separated by centrifugal force and which will hereinafter be called the centrifugated liquid No. 1, are then added 70 cubic centimetres of distilled water containing 0.044 gram of acetate of zinc, whereupon the mixture is subjected to shaking. The precipitate No. 2 produced thereby is separated by centrifugal force and dissolved in 40 cubic centimetres of alkaline water. This solution will be found to contain within 1 cubic centimetre, 2.3 per cent of albumin and 23 units of antitoxin, hence, 1 unit of antitoxin to 1 milligram of albumin.

To the centrifugated liquid No. 2 from which the precipitate No. 2 has been separated, are then added 40 cubic centimetres of distilled water containing 0.04 gram of acetate of zinc, whereupon the mixture is subjected to shaking. The precipitate No. 3 produced thereby is then separated by centrifugal force and dissolved in 75 cubic centimetres of alkaline water. This solution is found to contain within 1 cubic centimetre, 3.1 per cent of albumin and 124 units of antitoxin, hence 4.0 units of antitoxin to 1 milligram of albumin.

To the centrifugated liquid No. 3 from which the precipitate No. 3 has been separated by centrifugal force, are added 20 cubic centimetres of distilled water containing 0.02 gram of acetate of zinc, whereupon the mixture is subjected to shaking. The precipitate No. 4 produced thereby is separated by centrifugal force and dissolved in 49 cubic centimetres of alkaline water. This solution is found to contain within 1 cubic centimetre, 1.4 per cent of albumin and 77 units of antitoxin, hence, 5.5 units of antitoxin to 1 milligram of albumin.

To the centrifugated liquid No. 4 from which the precipitate No. 4 has been separated by centrifugal force, are added 40 cubic centimetres of distilled water containing 0.04 gram of acetate of zinc, whereupon the mixture is subjected to shaking. The precipitate No. 5 produced thereby is separated by centrifugal force and dissolved in 49 cubic centimetres of alkaline water. This solution is found to contain within 1 cubic centimetre 4.1 per cent of albumin and 226 units of antitoxin, hence, 5.5 units of antitoxin to 1 milligram of albumin.

To the centrifugated liquid No. 5 from which the precipitate No. 5 has been separated by centrifugal force, are added 40 cubic centimetres of distilled water containing 0.04 gram of acetate of zinc, whereupon the mixture is subjected to shaking. The precipitate No. 6 produced thereby is separated by centrifugal force and dissolved in 41 cubic centimetres of alkaline water. This solution is found to contain within one cubic centimetre, 2.4 per cent of albumin and 132 units of antitoxin, hence, 5.5 units of antitoxin to 1 milligram of albumin.

To the centrifugated liquid No. 6 from which the precipitate No. 6 has been separated by centrifugal force, are added 40 cubic centimetres of distilled water containing 0.04 gram of acetate of zinc, whereupon the mixture is subjected to shaking. The precipitate No. 7 produced thereby is separated by centrifugal force and dissolved in 49 cubic centimetres of alkaline water. This solution is found to contain within one cubic centimetre, 2.0 per cent of albumin and 90 units of antitoxin, hence, 4.5 units of antitoxin to 1 milligram of albumin.

The centrifugated liquid No. 7 which in this case is not split up further, has a total volume of 1985 cubic centimetres and contains within one cubic centimetre, 0.5 per cent of albumin and 8 units of antitoxin, hence 1.6 units of antitoxin to 1 milligram of albumin.

The initial substance, viz., diphtheria antitoxin serum, previously to the described treatment, contained within one cubic centimetre, 9.7 per cent of albumin and 250 units of antitoxin, hence, 2.6 units of antitoxin to one milligram of albumin.

The precipitates Nos. 1 and 2 and the centrifugated liquid No. 7 contain less of antitoxin per unit of albumin than the initial substance, while the precipitates Nos. 3 to 7 contain more than double as much of antitoxin per unit of albumin than the initial substance. To obtain the described 7 precipitates (fractional precipitates) but 0.3 gram of acetate of zinc are required while the total quantity of albumin amounts to 19.4 grams.

The presence of salts of metals within the precipitates cannot be proved chemically (however, this applies not to the centrifugated liquids). Hence, the compounds contain but traces of the precipitating agents employed. This is probably one cause of their ready solubility. On the other hand the practical absence of the precipitants is very valuable with regard to the therapeutical application of the compounds.

The novel process may also be carried out upon diluted serum or plasma; however, 2½ as much salts of heavy metals are required, then, in order to obtain the several precipitations.

For the purpose of the novel process, besides salts of zinc and copper, salts of lead and iron will be applicable, indeed, the salts of all those heavy metals which are capable to produce readily, and in an adequate concentration, soluble precipitations of albumin when added to the solution of albumin in a small quantity. Besides, the antitoxic albumin compounds, any bacterizidal, zylolytic, and precipitating compounds of albumin or serums are susceptible to the novel treatment provided for by my present invention.

Some of the salts of precious metals and semi-precious metals, inasmuch as the same are capable of producing soluble precipitates of albumin, especially so salts of mercury, as for instance, the mercury chloride, are just as active as precipitants of albumin as the salts of heavy metals proper mentioned above. The similarity with regard to their activity is so great with some of the salts of metals within the group of precious and semi-precious metals that the same may be used as precipitants in place of acetate of zinc in equi-molecular quantities and with the same effect as stated above with reference to the salts of heavy metals.

The precipitates of both of these groups of metal salts behave also alike as regards their solubility in alkaline water and their contents of medicinal or immunizing substances.

When treating a solution of albumin containing medicinal or immunizing substances, according to this invention, the solution may be subjected to a change of temperature or to the actions of electric currents, in order to insure more rapid coagulation.

What I claim as my invention and desire to secure by Letters Patent of the United States, is:—

1. The process of concentrating active constituents in solutions of albumin containing medicinal or immunizing substances, comprising adding to the solution of albumin successive portions of about .05 gram each of a metallic salt so that the precipitates formed are directly soluble in about 55 c. c. of water to yield solutions containing at least one per cent of albumin.

2. The herein described process comprising forming successive precipitates from a solution of albumin containing medicinal or immunizing substances by adding to such a solution, a solution containing about .05 gram of a metallic salt, whereby the resultant precepitates, especially those containing more of the active substances to one unit of albumin than the initial solution, are directly soluble in about 55 c. c. of water to yield solutions containing at least one per cent of albumin.

3. The herein described process which comprises adding to about 200 c. c of diphtheria serum, 200 c. c. of a solution of zinc acetate containing about .08 gram of zinc acetate, adding about 1600 c. c. of water, separating the precipitate formed from the liquid, adding to the separated liquid about 70 c. c. of a solution of zinc acetate containing about .04 gram of zinc acetate, and separating the resulting precipitate, and then effecting further precipitations and separations of a similar nature by using in succession about 40 c. c. of a solution of zinc acetate containing about .04 gram of zinc acetate, about 20 c. c. of a solution of zinc acetate containing about .02 gram of zinc acetate, about 40 c. c. of a solution of zinc acetate containing about .04 gram of zinc acetate; about 40 c. c. of a solution of zinc acetate containing about .04 gram of zinc acetate, and about 40 c. c. of a solution of zinc acetate containing about .04 gram of zinc acetate.

In testimony whereof I have signed my name to this specification in the presence of two subscribing witnesses.

JOHANNES KARL ZEISSLER.

Witnesses:
   IDA CHRIST HUFERMANN,
   FR. JULIUS POSHR.